S. H. DADDOW, dec'd.
E. A. DADDOW, Executrix.

Squib for Blasting.

No. 8,364. Reissued Aug. 6, 1878.

Attest:
H. L. Perrin
Albin M. Long

Inventor:
Mrs Esther A. Daddow
Executrix
By. H. T. Abbot
Atty.

UNITED STATES PATENT OFFICE.

ESTHER A. DADDOW, OF ST. CLAIR, PENNSYLVANIA, EXECUTRIX OF SAMUEL H. DADDOW, DECEASED.

IMPROVEMENT IN SQUIBS FOR BLASTING.

Specification forming part of Letters Patent No. 143,396, dated September 30, 1873; Reissue No. 8,364, dated August 6, 1878; application filed July 26, 1878.

*To all whom it may concern:*

Be it known that SAML. H. DADDOW, of St. Clair, Schuylkill county, Pennsylvania, did invent certain new and useful Improvements in Squibs for Blasting; and I do hereby declare that the following is a full, clear, and exact description thereof.

This invention relates to a new and useful improvement in squibs for the use of miners in the process of blasting coal, rock, &c.; and it consists in the construction and arrangement of parts hereinafter described.

Figure 1:
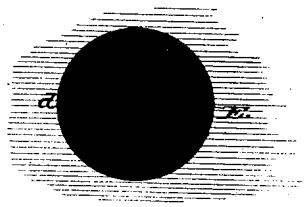
Figure 2:
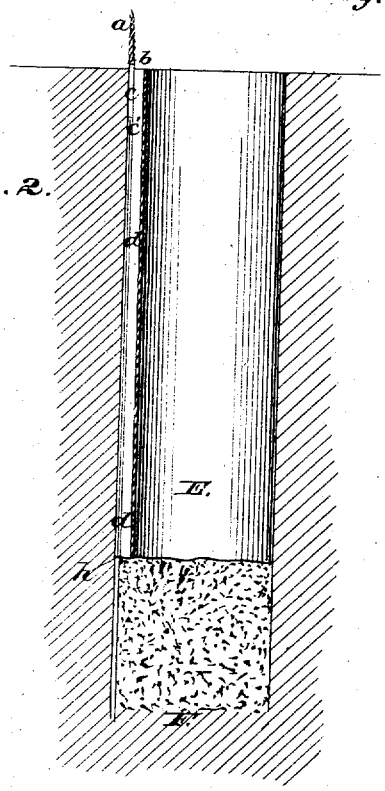
Figure 3:
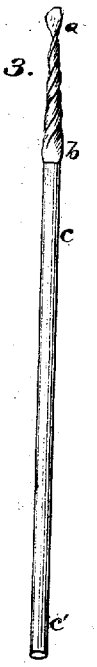
Figure 4:
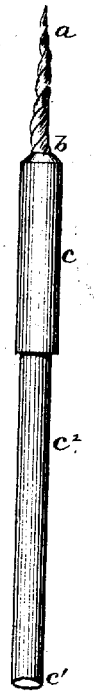

Figure 1 shows the position of one of the squibs in the drill-hole. Fig. 2 is a view of the drill-hole, showing the position of the cartridge and squib. Figs. 3 and 4 are side elevations of squibs complete, and Fig. 5 is a central longitudinal section of the squib shown in Fig. 4.

E represents the drill-hole, charged at F. *d* represents the needle-hole at the side, and *h* the point where it reaches the charge in the drill-hole. *a* represents the match or combustible portion of the squib, which is secured to the top of the tube *c*.

The squib-tube is an artificially prepared or manufactured imitation of straw as used for blasting. The tube may be drawn from sheet-brass or other ductile metal, and made very light and thin, or prepared from paper or other suitable material. One end of the squib-tube *b* is saturated with a solution of niter, liquid sulphur, or other inflammable material, or fitted with a match. The squib is then filled with powder and sealed at the end $c^1$.

Figure 5:
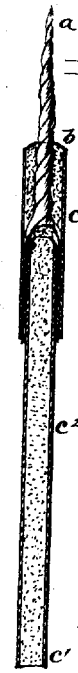

In firing deep or long holes, holes in which there is a liability of the squibs failing to operate on account of obstacles, or when dualin, dynamite, or other explosive compounds are used, which require violent concussion for effective use in blasting, I employ a squib having a detachable section or small squib, $c^2$, which is made smaller than the tube *c* and fits tightly therein, as represented in Figs. 4 and 5. The larger tube is charged with coarse powder, in order to prevent it running out at the small priming-hole, and on this the smaller squib $c^2$ is driven with the priming-hole on the powder. It is then charged and the end $c^1$ sealed.

In charging this tube $c^2$ it is partly filled with a slow-burning composition (any compound which will ignite freely and burn with certainty) and on this quick powder or fulminate is charged; if the former, the open end is closed with some soft substance; but if the latter or a bursting-charge is used, then it may be sealed tightly.

In operation the larger tube shoots the smaller one through the hole *d* into the powder or explosive, where it bursts or delivers its fire.

The squib may be used in the usual manner, or in the same manner in which the straw squib is used, and the operation of firing the charge in the cartridge is the same.

If desired, the tube may be coated with a fire-proof composition for the purpose of rendering it incombustible.

Having thus described the invention, what I claim as new and useful, and desire to secure by Letters Patent, is—

1. As a new article of manufacture, the squib with a match permanently attached thereto, substantially as shown and described.

2. A miner's squib having a detachable section adapted to be thrown by the explosion of the squib to fire the charge in the drill-hole, substantially as set forth.

In testimony that I claim the foregoing I have hereunto set my hand this 13th day of April, 1878.

MRS. ESTHER A. DADDOW,
*Executrix.*

Witnesses:
N. T. BEADLE,
GEORGE STEERE.